July 16, 1935.   P. W. BEGGS   2,008,198

VALVE

Filed April 29, 1933

Witness:
V. Tiljander

Inventor
Paul W. Beggs
By:
Hill & Hill  Attys

Patented July 16, 1935

2,008,198

UNITED STATES PATENT OFFICE 2,008,198

VALVE

Paul W. Beggs, Chicago, Ill., assignor to Jas. P. Marsh Corporation, Chicago, Ill., a corporation of Illinois Application April 29, 1933, Serial No. 668,607

6 Claims. (Cl. 137—153)

The invention relates to valves and particularly to that type having automatic means for regulating the quantity of fluid under pressure supplied to an element of a system such as, for instance, a heat exchange device of a heating system.

The invention has among its various objects the provision of a construction which will allow the valve to be set to permit a certain quantity of steam or other heating fluid under a certain pressure to be admitted to an element of the system and to automatically move toward a closed position in accordance with the pressure below atmospheric pressure contained within the body of the valve. In addition it is an object to provide a structure which will automatically cause the valve to move to an open position as the pressure increases and which will fully open when pressure at or above atmospheric pressure occurs within the valve body.

The invention has as another object the provision of means whereby the valve may be set to operate at a certain predetermined pressure below atmospheric pressure and thereby regulate the quantity of fluid circulating through the valve and which will upon changes of pressure occurring within the valve body vary the opening in accordance with said pressure.

Another object of the invention is to provide a valve with means for performing the advantages just referred to and which may be manually operated to close the valve.

It is another object of the invention to combine a pressure responsive element, a valve and a support for said pressure responsive element and valve and to mount the support for adjustment with relation to the valve body.

Another object of the invention is to employ the bonnet of the valve as a support for the pressure responsive element, the valve and the support for these two last mentioned elements so that these and the stem of the valve may be adjusted as a unit with relation to a seat for the valve.

Another object of the invention is to employ a pressure responsive element of a tubular character and to support this element from its lower end and to arrange the valve so that it is supported from the upper end of said element.

The invention has these and other objects, all of which will be explained in detail and more readily understood when read in conjunction with the accompanying drawing which shows one embodiment of which the invention is susceptible, it being manifest that changes and modifications may be resorted to without departing from the spirit of the appended claims forming a part hereof.

Figure 1:
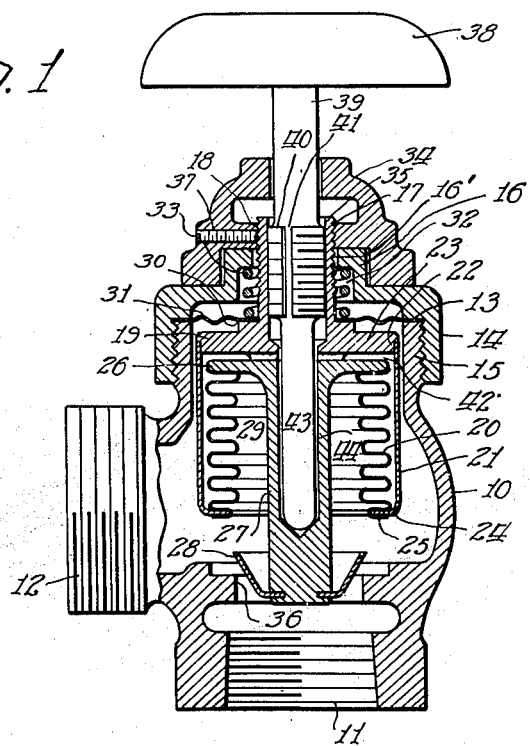
Figure 2:
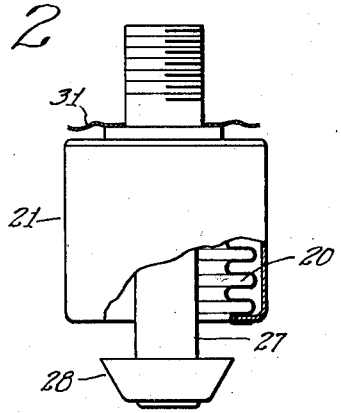

In the drawing, Fig. 1 is a central longitudinal section of a valve embodying the invention; and Fig. 2 is a section of an element of the structure shown in Fig. 1 illustrating the unit which is adapted to be adjusted relatively to the valve body and the valve seat of said body.

The embodiment of the invention illustrated contemplates the utilization of a valve body 10 having a threaded inlet opening 11 and a threaded outlet opening 12. The body 10 is provided with another opening 13 which is closed by a bonnet 14 which is threadedly connected to the neck 15 of the valve body 10.

The bonnet 14 is provided with an annular shoulder 16 having an opening 16', the latter being provided for the reception of a threaded element 18 extending from a member providing a support generally designated 19 for supporting the pressure responsive element generally designated 20.

This support 19 is comprised of a tubular member 21, one end of which such as 22 is closed by a plate-like element 23 having the threaded extension 18. The lower end 24 of the tubular element 21 of the support generally designated 19 is provided with an inwardly projecting annular flange 25 with which the adjacent end of the pressure responsive element 20 is connected and supported.

The pressure responsive element 20 is of corrugated tubular formation and has the upper end thereof connected with the annular flange 26 of the post-like member 27 to which the valve head 28 is connected.

The upper end of the post-like member 27 engages the plate-like element 23 of the support generally designated 19, however, is movable relatively to this portion when pressure below atmospheric pressure occurs within the chamber 29 of the pressure responsive element 20.

The plate-like element 23 is provided with an annular shoulder 30 and a corrugated packing disc 31 is secured to this shoulder and extends therefrom to the neck 15 of the valve body, the packing disc being clamped between the upper edge of the neck 15 and a portion of the bonnet 14. The annular shoulder 16 of the bonnet 14 is provided with an annular recess 32 for the reception of one end of a coil spring 33 which reacts between the shoulder 30 of the plate-like element 23 and an end of the recess 32 and is provided to relieve the packing disc or diaphragm 31 against pressures exerted thereon and to cause movement in one direction of the elements 23, post 27 and other related elements such as the valve 28 connected with said post when the position of the valve is manually adjusted.

An adjusting nut 34 is arranged upon the bonnet 14 and cooperates with the annular shoulder 16 to hold the said nut in rotatable engagement with the bonnet and the remaining structure of the valve. This adjusting nut 34 is provided with threads 35 which cooperate with the threads 17 formed upon the neck 18 to provide means for adjusting and holding the supporting member 19 and the valve 28 in various positions of adjustment relatively to the valve seat 36. The locking nut 34 is provided with a set screw 37 to hold same against manipulation and prevent accidental movement of the supporting member and the valve 28 from any one of its several adjusted positions.

When it is desired to adjust the valve 28, the adjusting nut 34 will be rotated, and thus depending upon the direction of rotation of said nut will cause the valve and the other elements connected therewith to be moved toward or away from the valve seat which will govern the quantity of fluid normally introduced to a radiator.

For manual operation, the valve is provided with a hand wheel 38 having a stem 39, the latter being threaded at 40 to cause longitudinal movement of said stem, the said stem being also provided with a slot or passage 41 to permit atmosphere to enter the chamber 42 which chamber is formed within the tubular element 21 and outside the tubular pressure responsive element 20. The stem 39 has an extension 43 which operates in a recess 44 provided in the post-like member 27, it being understood that the plate-like element 23 is provided with an opening to permit the extension 43 to be introduced to the recess 44.

Upon operation of the hand wheel 38, the stem 39 will be moved longitudinally of the valve and will, when rotated in one direction, engage the bottom of the recess 44 and cause the pressure responsive element 20 to be contracted and the valve to be moved toward its seat. When the hand wheel 38 is operated in the reverse direction, manifestly the extension 43 will be moved relatively to the end of the recess so as to permit free movement of the valve in either direction, and thus, when any pressure below atmospheric pressure obtains in the valve body 10 and chamber 29 of the pressure responsive element 20, the valve will be moved by atmospheric pressure toward a closing position, it being understood that upon fluctuations of this pressure, the valve will be moved relatively to the valve seat 36 in accordance with these fluctuations of pressure and thus automatically regulate the quantity of fluid passing through the valve. When fluid under pressure above atmospheric pressure is applied to the pressure responsive element 20, the valve is fully open or will open to a position dependent upon the position which the extension of the stem bears to the end of the recess 44.

From the foregoing description of the invention, it is believed evident that a unitary device is provided comprised of the supporting element generally designated 19, the pressure responsive element 20, the tubular post 27 and the valve 28 and that upon rotation of the adjusting nut 34 said unitary structure will, by virtue of the threads provided upon the neck 18 and the coil spring 33 be moved relative to the seat of said valve, and thus regulate the amount of fluid which may normally circulate through the valve. It is further evident that when a pressure below atmospheric pressure exists in the chamber 29 of the pressure responsive element 20, this element and the valve will be moved by atmospheric pressure toward the seat and thus reduce the quantity of fluid circulating through the valve.

Having thus described the invention, what I claim as new and desire to cover by Letters Patent is:

1. In a device of the class described, the combination of a valve body having a valve seat and inlet and outlet ports formed therein, a valve head operatively related to said seat, supporting means for said head, said means including a tubular member and a pressure responsive element adjustable bodily in said valve body and providing a chamber communicating with the atmosphere, the atmospheric pressure in said chamber being operative to move said valve head towards said valve seat when the pressure differential between atmospheric pressure in said chamber and sub-atmospheric pressure in said valve body increases, said valve head being movable away from said seat when said pressure differential decreases.

2. In a device of the class described, the combination of a valve body having a valve seat and inlet and outlet ports formed therein, a valve head operatively related to said seat, supporting means for said head adjustably mounted in said body, said means including a tubular member and a pressure responsive element within said member providing a chamber outside said pressure responsive element, said chamber communicating with the atmosphere, the atmospheric pressure in said chamber being operative to move said valve head towards said valve seat when the pressure differential between atmospheric pressure in said chamber and sub-atmospheric pressure in said valve body increases.

3. In a device of the class described, the combination of a valve body having a valve seat and inlet and outlet ports formed therein, a valve head operatively related to said seat, supporting means for said head, said means including a tubular member and a pressure responsive element within said member providing a chamber outside said pressure responsive element, said chamber communicating with the atmosphere, the atmospheric pressure only in said chamber being operative to move said valve head towards said valve seat when the pressure differential between atmospheric pressure in said chamber and subatmospheric pressure in said valve body increases, and means outside said body for manually adjusting said supporting means with respect to the body and for securing the supporting means in adjusted position.

4. In a device of the class described, the combination of a valve body having a valve seat and inlet and outlet ports formed therein, a bonnet rigidly secured to said body, a valve head operatively related to said seat, supporting means for said head, said means including a supporting element having an apertured extension slidably positioned in said bonnet and extending outwardly therefrom, a tubular member mounted on said supporting element, a pressure responsive element within said tubular member and operatively related to said valve head and to said member for providing a chamber outside said pressure responsive element communicating with the atmosphere through the aperture formed in the extension of said supporting element, and means operatively related to said extension and said bonnet for adjusting said supporting means and valve head with respect to said valve seat.

5. In a device of the class described, the combination of a valve body having a valve seat and inlet and outlet ports formed therein, a bonnet rigidly secured to said body, a valve head operatively related to said seat, supporting means for said head, said means including a supporting element having an apertured externally threaded extension slidably positioned in said bonnet and extending outwardly therefrom, resilient means positioned between said supporting element and a portion of said bonnet, a tubular member mounted on said supporting element, a pressure responsive element within said tubular member and operatively related to said valve head and to said member for providing a chamber outside said pressure responsive element communicating with the atmosphere through the aperture formed in the extension of said supporting element, and an adjusting nut operatively related to said threaded extension and said bonnet for moving said supporting means against the action of said resilient means and adjusting the valve head with respect to the valve seat.

6. In a device of the class described, the combination of a valve body having a valve seat and inlet and outlet ports formed therein, a bonnet rigidly secured to said body, a valve head operatively related to said seat, supporting means for said head, said means including a supporting element having an apertured internally and externally threaded extension slidably positioned in said bonnet and extending outwardly therefrom, a coil spring surrounding said extension and operative between said supporting element and a portion of said bonnet for moving the supporting element in one direction, a tubular member mounted on said supporting element, a flanged post-like member having a recess formed therein secured to said valve head and relatively movable with respect to said supporting element and tubular member, a pressure responsive element operatively related to said flanged member and tubular member for providing a chamber outside and surrounding said pressure responsive element and communicating with the aperture formed in said supporting element, an adjusting nut operatively related to the externally threaded portion of said extension and to said bonnet for moving said valve head, pressure responsive element and supporting element bodily in one direction with respect to said valve seat and against the action of said spring, and a manually operable valve stem having a portion positioned in the recess of said flanged member and having a screw threaded portion operatively related to the internally threaded portion of the supporting element extension for adjusting the valve head and flanged member relatively to the supporting element and tubular member mounted thereon, said stem having a passage formed therein for providing communication between the atmosphere and the chamber surrounding said pressure responsive element.

PAUL W. BEGGS.